Figure 1:
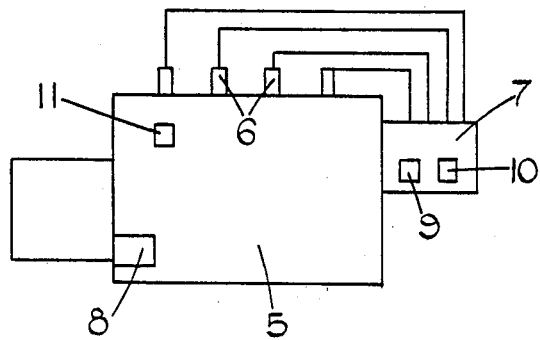

United States Patent [19]
Greeves

[11] 4,449,501
[45] May 22, 1984

[54] DEVICE FOR ADJUSTING ENGINE TIMING

[75] Inventor: Godfrey Greeves, Hatch End, England

[73] Assignee: Lucas Industries Limited, Birmingham, England

[21] Appl. No.: 324,601

[22] Filed: Nov. 24, 1981

[30] Foreign Application Priority Data

Dec. 31, 1980 [GB] United Kingdom ............... 8041548

[51] Int. Cl.³ ............................................. F02P 5/04
[52] U.S. Cl. .................................. 123/425; 123/435; 123/501; 73/35
[58] Field of Search ............... 123/435, 425, 501, 502; 73/35

[56] References Cited

U.S. PATENT DOCUMENTS

| 2,335,944 | 11/1943 | Lieberherr | 123/435 |
| 2,621,642 | 12/1952 | Malick | 123/435 |
| 4,033,310 | 7/1977 | Nicolls | 123/501 |
| 4,116,175 | 9/1978 | Sand | 123/425 |
| 4,327,688 | 5/1982 | Lowther | 123/435 |
| 4,367,716 | 1/1983 | Yasuhara | 123/501 |

FOREIGN PATENT DOCUMENTS

| 55-46073 | 3/1980 | Japan | 123/425 |
| 2031550 | 4/1980 | United Kingdom | 123/501 |

Primary Examiner—Parshotam S. Lall

[57] ABSTRACT

The timing of delivery of fuel to a compression ignition engine is determined and adjusted by observing the peak pressure attained in a combustion chamber during a fueled working stroke of the engine. This is compared with a derived peak pressure and a timing adjustment made. The condition of the engine is taken into account by comparing an actual pressure ratio with a desired pressure ratio, the actual pressure ratio being determined by obtaining a peak pressure signal when fuel is supplied or a pressure signal at a fixed point in the working stroke before fuel is supplied. The desired pressure ratio is provided by a circuit to which signals representing engine speed and fuel quantity are supplied.

6 Claims, 4 Drawing Figures

DEVICE FOR ADJUSTING ENGINE TIMING

This invention relates to an engine system comprising a reciprocating piston engine, means for feeding fuel to the engine and further means operable to effect an adjustment of the commencement of combustion of fuel in the engine.

In the case of a compression ignition engine it is well known in the art that the timing of delivery of fuel to the combustion space or spaces of the engine is an important factor in relation to exhaust emissions, fuel consumption and power output. It is also known that the actual timing of delivery of fuel does not necessarily provide an accurate indication of when combustion of the injected fuel commences since this can vary depending upon a number of factors such for example as air temperature and fuel quality.

In order to detect combustion of the fuel in an engine cylinder or combustion space it is known to use ionization probes which detect the passage of flame within the cylinder or combustion chamber but there is difficulty in positioning the probe so that a reliable indication can be obtained over a wide range of engine operating conditions. Attempts have also been made to provide optical devices but these have a very limited life and their accuracy is impaired by soot formation.

It is known that the peak pressure attained in the combustion space during engine operation depends in part upon the instant at which combustion starts and therefore the timing of delivery of fuel in the case of a compression ignition engine and the ignition timing in the case of a spark ignition engine. For example in a compression ignition engine for a given engine speed and fuel quantity the peak pressure will increase as the timing of fuel delivery is advanced. In the case of a spark ignition engine the peak pressure tends to increase as the ignition timing is advanced. The peak pressure does also depend upon a number of other factors for example the fuel quality, the engine speed and also the engine condition.

The object of the present invention is to provide an engine system of the kind specified in a simple and convenient form.

According to the invention an engine system of the kind specified comprises a pressure transducer means for providing an electrical signal representative of the peak pressure attained within a combustion space of the engine, means for providing a signal representing the desired peak pressure, said means being provided with information relative to the engine speed and the fuel quantity and means for comparing said signals, the output of said means acting as a control signal for the means operable to effect an adjustment of the commencement of combustion of fuel.

Unlike an ionization probe a pressure transducer can provide an indication of an increase of pressure in the combustion chamber or cylinder irrespective of where combustion starts in the chamber or cylinder. Moreover, the pressure transducer is relatively unaffected by the formation of deposits in the combustion chamber or cylinder.

Figure 2:
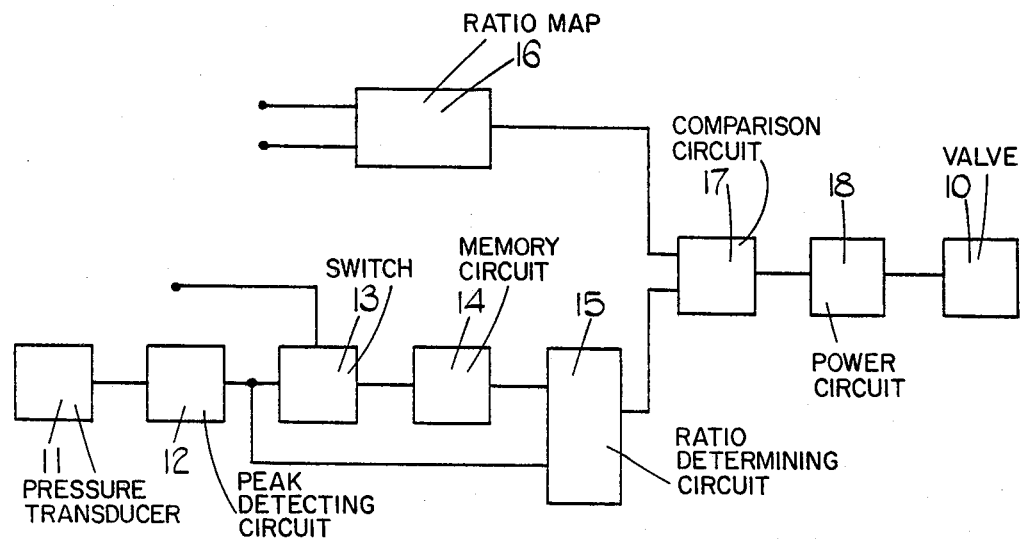
Figure 3:
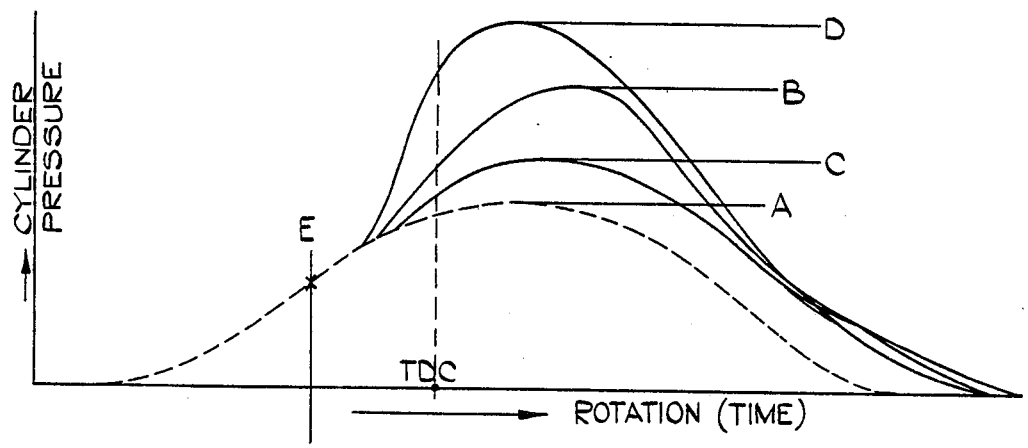
Figure 4:
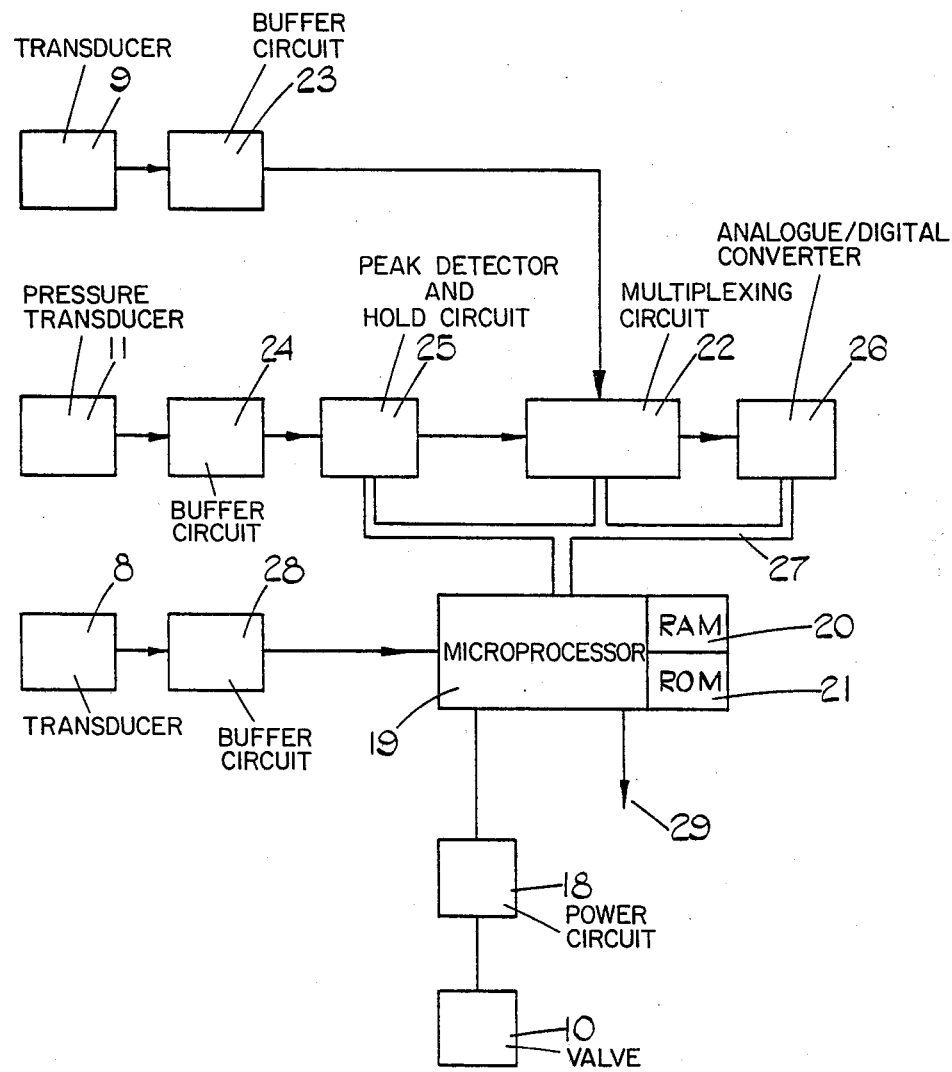

An example of an engine system in accordance with the invention will now be described with reference to the accompanying drawings in which:

FIG. 1 is a representation of a compression ignition engine forming part of the system, FIG. 2 is a block diagram of the electrical components of the system, FIG. 3 is a graph illustrating varying pressures within a combustion chamber of the engine, and FIG. 4 is a block diagram of another arrangement of the electrical components.

As shown in FIG. 1 the engine system includes a compression ignition engine 5 having a plurality of combustion spaces to which fuel is supplied by injection nozzles 6 respectively. The nozzles are supplied with fuel in timed relationship with the engine by a fuel pump 7. The pump includes a device for adjusting the timing of delivery of fuel this conveniently comprising a piston which determines the setting of an actuating cam, the pressure applied to the piston being controlled by an electromagnetic valve 10.

A pressure transducer 11 is provided and this is mounted to provide an electrical signal representing the pressure within a combustion space of the engine, during operation of the engine. The engine also carries a transducer 8 which provides signals indicative of the speed of the engine and the fuel pump carries a transducer 9 which provides a signal indicative of the amount of fuel being supplied to the engine.

As shown in FIG. 2, the signal from the transducer 11 is supplied to a peak detecting circuit 12 which provides a signal representing the peak value of the pressure attained in the combustion chamber during the working stroke of the piston associated with the combustion space. The signal from the circuit 12 is supplied by way of a switch 13, to a memory circuit 14 and from the memory circuit to a ratio determining circuit 15. The circuit 15 also receives a signal direct from the circuit 12. A signal is supplied to the memory 14 by way of the switch 13, periodically during the operation of the engine and this is arranged to occur when no fuel is being supplied to the combustion space. The peak value or reference pressure stored in the memory 14 will vary in accordance with the speed at which the engine is operating and also the condition of the engine. In addition, the pressure will vary in accordance with the temperature of the air drawn into the combustion space. This value of pressure together with the peak values of pressure which are obtained whilst fuel is being supplied to the combustion space, are supplied to the ratio determining circuit which provides a signal representing the ratios of the aforesaid pressures.

The system includes a ratio map 16. This contains stored information giving the desired ratio of pressures at different engine speeds and loads i.e. fuel quantity. The map 16 is therefore supplied with an engine speed signal from a circuit associated with the transducer 8 and a fuel quantity signal from the transducer 9. The output of the circuit 16 is the desired ratio of pressures. The outputs from the circuits 15 and 16 are compared in a comparision circuit 17 and the output of this circuit is supplied to a power circuit 18 which controls the operation of the valve 10.

In FIG. 3 the peak value A represents the reference pressure and the peak value B the desired peak pressure in the combustion space. The peak value D is obtained when the timing of delivery is too early. In this situation the actual pressure ratio is higher than desired and the valve 10 is adjusted to retard the timing of delivery. The peak value C is obtained when the timing of delivery is too late. This results in a lower ratio than the desired ratio and the valve 10 is adjusted to advance the timing of delivery.

The information stored in the circuit 14 is updated periodically during operation of the engine and this can be effected using a time circuit which controls the operation of the switch 13 and also inhibits delivery of fuel to the particular combustion space with which the transducer 11 is associated.

The system as described takes into account variation in the quality of fuel supplied to the engine whilst it is in operation.

As an alternative to using the peak value A to update the memory circuit 14 which operation requires that the supply of fuel must be prevented, the memory can be updated at a fixed point E during the compression stroke. The point E is chosen so that it is before any fuel is supplied to the combustion chamber. From the pressure value obtained at point E the peak pressure A can be estimated or it may be possible to use the pressure value obtained at point E when determining the actual pressure ratio. In this case the input of the switch 13 is taken directly from the transducer output.

An alternative system is shown in FIG. 4 and this is based upon a microprocessor indicated at 19 and incorporating a Random Access memory 20 and a Read Only memory 21. The fuel quantity signal provided by the transducer 9 is supplied to a multiplexing circuit 22 by way of a buffer circuit 23 and the signal provided by the pressure transducer 11 is supplied by way of a buffer circuit 24 to a peak detector and hold circuit 25 which has its output connected to the multiplexing circuit 22. The output of the multiplexing circuit 22 is connected to an analogue/digital converter 26. The converter, the multiplexing circuit and the peak hold circuit are connected by an address/data bus 27 to the microprocessor. The transducer 8 is connected through a buffer circuit 28 to the microprocessor 19 and the microprocessor is connected to the circuit 18 to control the valve 10. The microprocessor also has an output 29 which is connected to a fuel control circuit.

The memory 20 provides a workspace for the microprocessor and is also used to store the current reference peak pressure. The other memory contains the stored working program of the microprocessor and also the peak pressure ratio map. The transducer 8 provides a signal at about 30° before top dead centre and the speed is calculated by the microprocessor by timing the interval between the signals produced by the transducer 8. The signal provided by the transducer 8 is also utilized to reset the peak hold circuit 25 ready for the next reading and it is also counted to provide a signal at the output 29 when it is required to reduce the fuel supplied to the engine to zero for the purpose of establishing a new reference pressure. The control of the microprocessor is effected by the stored working but in general the microprocessor performs the following tasks:

(1) Every $n^{th}$ engine revolution reduce the fuel to zero and store the peak compression pressure as the reference.

(2) Calculate the engine speed.

(3) Read and store the peak compression pressure each revolution of the engine and calculate the ratio actual compression pressure/reference pressure.

(4) Read and store the output of transducer 9.

(5) Obtain from the memory 21 the correct pressure ratio for the speed and engine fuel quantity.

(6) Compare the actual ratio with the desired ratio.

(7) Energise the valve 10 to correct the ratio.

It will be understood that the systems as described with very little modification can be used to control the ignition timing in a spark ignition engine.

I claim:

1. An engine system comprising a reciprocating piston engine means for feeding fuel to the engine, means operable to effect an adjustment of the commencement of fuel injection in a diesel engine or ignition timing in a spark ignition engine, pressure transducer means for providing an electrical signal representative of the peak pressure attained within a combustion space of the engine, means for providing a signal representing the desired peak pressure, said last named means being provided with information relative to the engine speed and the fuel quantity, and means for comparing said signals, the output of said comparing means acting as a control signal for the means operable to effect an adjustment of the commencement of fuel injection in a diesel engine or ignition timing in a spark ignition engine and said pressure transducer means including a ratio determining circuit, means for supplying to the ratio determining circuit a peak pressure signal obtained during a fueled working stroke of the engine and a no fuel pressure signal obtained at an instant during a working stroke when no fuel is in the combustion chamber, said means for providing a signal representing the desired peak pressure comprising a ratio map.

2. A system according to claim 1 in which said pressure transducer means comprises a pressure transducer and a peak detection circuit which receives a signal from said transducer and provides the peak pressure signal obtained during a fueled working stroke.

3. A system according to claim 2 including a memory circuit which supplies the no fuel pressure signal to the ratio determining circuit and a switch operable to connect the peak detection circuit to the memory circuit during a working stroke when no fuel is supplied to the combustion chamber.

4. A system according to claim 2 including a memory circuit which supplies the no fuel pressure signal to the ratio determining circuit and a switch operable to connect the memory circuit to the output of said transducer at a point in the working stroke before fuel is supplied to the combustion chamber.

5. An engine system comprising a reciprocating piston engine means for feeding fuel to the engine, means operable to effect an adjustment of the commencement of fuel ignition in a diesel engine or ignition timing in a spark ignition engine, pressure transducer means for providing an electrical signal representative of the peak pressure attained within a combustion space of the engine, means for providing a signal representing the desired peak pressure, said last named means being provided with information relative to the engine speed and the fuel quantity, and means for comparing said signals, the output of said comparing means acting as a control signal for the means operable to effect an adjustment of the commencement of fuel ignition in a diesel engine or ignition timing in a spark ignition engine and said pressure transducer means comprising a pressure transducer and a peak detector and hold circuit, means for providing an engine position signal, microprocessor means receiving said signals, said microprocessor means including a memory in which can be stored the peak pressure signal provided by said peak detector and hold circuit during a working cycle when no fuel is supplied to the engine, said microprocessor means including a further memory in which is stored a peak pressure ratio map, said microprocessor means calculating the ratio of the peak pressure signal obtained when fuel is supplied to the engine and the peak pressure attained when no fuel is supplied to the engine and comparing the calculated ratio with a ratio value extracted from said further memory to produce said control signal.

6. A system according to claim 5 in which the ratio value extracted from said further memory is dependant upon the fuel quantity and speed of the engine.

* * * * *